United States Patent
Messinger et al.

(10) Patent No.: US 9,002,795 B2
(45) Date of Patent: Apr. 7, 2015

(54) OBJECT-BASED DATA STORAGE DEVICE

(75) Inventors: Daniel Edward Messinger, Waconia, MN (US); Wilson M. Fish, Yukon, OK (US); Sami Iren, Pittsburgh, PA (US); Erik Riedel, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 1194 days.

(21) Appl. No.: 11/339,991

(22) Filed: Jan. 26, 2006

(65) Prior Publication Data

US 2007/0185902 A1 Aug. 9, 2007

(51) Int. Cl.
  *G06F 7/00* (2006.01)
  *G06F 17/00* (2006.01)
  *G06F 3/06* (2006.01)
  *G06F 13/00* (2006.01)
  *G06F 13/28* (2006.01)

(52) U.S. Cl.
  CPC ............ *G06F 3/0644* (2013.01); *G06F 3/0613* (2013.01); *G06F 3/0619* (2013.01); *G06F 3/0676* (2013.01)

(58) Field of Classification Search
  None
  See application file for complete search history.

(56) References Cited

U.S. PATENT DOCUMENTS

| | | | | |
|---|---|---|---|---|
| 5,166,936 A * | 11/1992 | Ewert et al. | ................... | 714/723 |
| 5,475,540 A * | 12/1995 | Gold | ............................... | 360/48 |
| 5,963,937 A * | 10/1999 | Yamasaki et al. | ................. | 707/4 |
| 6,128,717 A * | 10/2000 | Harrison et al. | ............. | 711/202 |
| 6,601,101 B1 | 7/2003 | Lee et al. | ...................... | 709/227 |
| 6,745,285 B2 | 6/2004 | Howard et al. | ............... | 711/114 |
| 6,823,398 B1 | 11/2004 | Lee et al. | ........................... | 710/5 |
| 6,826,613 B1 | 11/2004 | Wang et al. | ..................... | 79/227 |
| 6,850,969 B2 | 2/2005 | Ladan-Mozes et al. | ...... | 709/213 |
| 7,096,336 B2 | 8/2006 | Furuhashi et al. | | |
| 7,124,272 B1 * | 10/2006 | Kennedy et al. | ............. | 711/173 |
| 7,194,594 B2 | 3/2007 | Asami et al. | | |
| 2001/0018727 A1 * | 8/2001 | Ando et al. | .................... | 711/112 |
| 2002/0078066 A1 | 6/2002 | Robinson et al. | .......... | 707/104.1 |
| 2002/0095546 A1 * | 7/2002 | Dimitri et al. | ................ | 711/112 |
| 2002/0159362 A1 * | 10/2002 | Yoshimoto et al. | ........ | 369/53.21 |
| 2003/0088591 A1 | 5/2003 | Fish | ............................. | 707/204 |

(Continued)

FOREIGN PATENT DOCUMENTS

| | | | |
|---|---|---|---|
| JP | 2003153185 A | 5/2003 | |
| JP | 2004086512 A | 3/2004 | |

(Continued)

OTHER PUBLICATIONS

Michael Borgwardt, Haruo Yokota, Treatment of Arbitrary-Size Data in Autonomous Disks, Information Processing Society of Japan, vol. 2001, No. 70, pp. 127-134.*

(Continued)

*Primary Examiner* — Jason Liao
(74) *Attorney, Agent, or Firm* — Westman, Champlin & Koehler, P.A.

(57) ABSTRACT

A data storage device includes storage media with multiple media zone attributes of storage performance. The storage device includes a data channel that is connectable to a host system. The data channel receives an object from the host system that has a requested storage attribute attached to the object. The storage device comprises an object-based storage interface that couples between the data channel and the storage media. The object-based storage interface schedules the object for storage in a selected zone of the multiple media zones based on the attributes and requested attributes.

8 Claims, 5 Drawing Sheets

(56) References Cited

U.S. PATENT DOCUMENTS

| | | | |
|---|---|---|---|
| 2004/0043755 A1 | 3/2004 | Shimooka et al. | |
| 2004/0054648 A1 | 3/2004 | Mogi et al. | 707/1 |
| 2004/0059759 A1 | 3/2004 | Doan et al. | 707/205 |
| 2004/0221118 A1 | 11/2004 | Slater et al. | 711/163 |
| 2005/0102297 A1 | 5/2005 | Lloyd et al. | 707/100 |
| 2006/0288156 A1* | 12/2006 | Fish et al. | 711/112 |

FOREIGN PATENT DOCUMENTS

| | | |
|---|---|---|
| JP | 2005196625 A | 7/2005 |
| JP | 2005228404 A | 8/2005 |
| JP | 2005338985 A | 12/2005 |
| WO | 03027856 A1 | 4/2003 |

OTHER PUBLICATIONS

Andreas Vogel, Brigitte Kerherve, Gregor von Bochmann, Jan Gecsei, Distributed Multimedia and QOS: A Survey, Summer 1995, IEEE, pp. 10-19.*

Sage A. Weil, Scalable Archival Data and Metadata Management in Object-based File Systems, Spring 2004, University of California, Santa Cruz.*

Kevin KleinOsowski, Tom Ruwart, David J. Lilja, Communicating Quality of Service Requirements to an Object-Based Storage Device, 2005, 22nd IEEE/13th NASA Goddard Conference on Mass Storage Systems and Technologies (MSST'05).*

Talagala et al., "Microbenchmark-based Extraction of Local and Global Disk Characteristics," University of California, Berkeley, 1999.*

Cabrera et al., "Swift: Using Distributed Disk Striping to Provide High I/O Data Rates," CiteSeer, 1991.*

Chee et al., "Adaptive Prefectching and Storage Reorganization in a Log-Structured Storage System", IEEE, 1998.*

Wu et al., "An Efficient B-Tree Layer for Flash-Memory Storage Systems", Springer-Verlag Berline Heidelberg, 2004.*

Golding et al., "Attribute-managed storage," Hewlett Packard Company, 1995.*

Tao et al., "The TRP*-Tree: An Optimized Spatio-Temporal Access Method for Predictive Queries," Proceedings of the 29th VLDB Conference, 2003.*

120 mm DVD Rewritale Disk (DVD-RAM) Jun. 99, Ecma, 2nd ed, 115 pages.*

Rusling, Chapter 15: Linux Data Structures, tldp.org, http://www.tldp.org/LDP/tlk/ds/ds.html.*

Operating Systems: Start Lecture #14 Spring 05, http://www.cs.nyu.edu/courses/spring05/G22.2250-001/lectures/lecture-14.html.*

Wong, Some Discrete Optimization Problems With Secondary Storage Applications Oct. 76, unknown [Accessed at ftp://userweb.cs.utexas.edu/pub/techreports/tr76-62.pdf], 39 pages.*

Bergmans, Minimizing expected travel time on geometrical patterns by optimal probability rearrangements May 72, Information and Control vol. 20 Issue 4, pp. 331-350.*

Triantafillou et al, Optimal Data Placement on Disks: A Comprehensive Solution for Different Technologies Dec. 2, 1996, IEEE Transactions on Knowledge and Data Engineering, vol. 12 pp. 324-330.*

Storage Area Networking, "Object-Based Storage," Mike Mesnier, Carnegie Mellon and Intel, Gregory R. Ganger, Erik Riedel, Seagate Research, IEEE Communications Magazine, Aug. 2003, pp. 84-90.

"The Panasas Active Scale Storage Cluster—Delivering Scalable High Bandwidth Storage," David Nagle, Denis Serenyi and Abbie, Matthews, ACM/IEEE SC2004 Conference, Nov. 6-12, 2004, 10 pages.

"Soss: Smark Object-Based Storage System," Ling-Fang Zeng, Dan Feng and Ling-Jun Qin, Proceedings of the Third International Conference on Machine Learning and Cybernetics, Shanghai, Aug. 26-29, 2004, pp. 3263-3266.

"4 SCSI OSD Model," T10/1355-D Revision 05, Working Draft SCSI Object Based Storage Device Commands (OSD), Mar. 29, 2002, pp. 11-17.

"Efficient Metadata Management in Large Distributed Storage Systems," Scott A. Brandt, Ethan L. Miller, Darrell D. E. Long and Lan Xue, $20^{th}$ IEEE/$11^{th}$ NASA Goodard Conference on Mass Storage Systems and Technologies, Apr. 2003.

"Evaluation of Distributed Recovery in Large-Scale Storage Systems," Qin Xin, Ethan L. Miller and Thomas J. E. Schwarz, S.J., $13^{th}$ IEEE International Symposium on High Performance Distributed Computing, Jun. 2004, 10 pages.

"Object-Based Storage Systems @ SSRC," Storage Systems Research Center, University of California, last updated Feb. 17, 2005, pp. 1-5.

"Intra-file Security for a Distributed File System," Scott A. Banachowski, Zachary N.J. Peterson, Ethan L. Miller and Scott A. Brandt, $10^{th}$ Goddard Conference on Mass Storage Systems and Technologies, Apr. 2002, pp. 153-163.

"OBFS: A File System for Object-Based Storage Devices," Feng Want, Scott A. Brandt, Ethan L. Miller, Darrell D.E. Long, $21^{st}$ IEEE/$12^{th}$ NASA Goddard Conference on Mass Storage Systems and Technologies, Apr. 2004, pp. 1-18.

3 web pages from Enterprise Storage Forum.com, "Storage Focus: File System Fragmentation," Henry Newman, May 21, 2004.

"The object is better backup," Storage Magazine, John Merryman, May 2004, pp. 1-4.

"You Don't Know Jack About Disks," Dave Anderson, Seagate Technology, QUEUE, Jun. 2003, pp. 20-30.

"Object Storage: Scalable Bandwidth for HPC Clusters," Garth A. Gibson, Brent B. Welch, David F. Nagle and Bruce C. Moxon, Aug. 1984-Apr. 2003, 19 pages.

"Interposed Request Routing for Scalable Network Storage," Darrell C. Anderson, Jeffrey S. Chase and Amin M. Vahdat, Aug. 1984-Aug. 2000, 14 pages.

"Network Attached Storage Architecture," Garth A. Gibson and Rodney Van Meter, Communications of the ACK, Nov. 2000, vol. 43, No. 11, pp. 37-45.

"An Information-Interconnectivity-Based Retrieval Method for Network Attached Storage," Iliya K. Georgiev and Ivo I. Georgiev, Oct. 1997-2003, pp. 268-275.

"Decentralized Authentication Mechanisms for Object-bassed Storage Devices," Vishal Kher and Yongdae Kim, Second IEEE International Security in Storage Workshop, 2004, 10 pages.

"An experimental object-based sharing system for networked databases," Doug Fang, Shahram Ghandeharizadeh and Dennis McLeod, Received Oct. 29, 1992/Accepted Mar. 1, 1995, 15 pages.

"Object-Based and Image-Based Object Representations," Hanan Samet, ACM Computing Surveys, vol. 36, No. 2, Jun. 2004, pp. 159-217.

"ADS—A Handle-based Storage Architecture under Grid Computing," Lee C. Hu and Sam X. Sun, 2003 IEEE, pp. 187-193.

English Translation of Japanese Office Action dated Sep. 25, 2009 from Corresponding Japanese Application No. 2007014879.

Japanese Interrogative Office Action (Questioning) dated Dec. 13, 2011, from Japanese Patent Application No. 2007-014879, filed Jan. 25, 2007.

* cited by examiner

OBJECT-BASED DATA STORAGE DEVICE

FIELD OF THE INVENTION

The present invention relates generally to data storage, and more particularly but not by limitation to object-based storage devices.

BACKGROUND OF THE INVENTION

Computer environments are moving more in the direction of object-based application programs that generate program objects that require storage and retrieval on storage media. These program objects can have diverse characteristics in terms of requirements for quality of service by the storage device. The objects can have differing combinations of requirements for reliability, data transfer storage rate, data transfer retrieval rate, jitter, freedom from error and so forth.

There is a need to adapt object based storage devices to better accommodate the differing combinations of storage needs. Embodiments of the present invention provide solutions to these and other problems, and offer other advantages over the prior art.

SUMMARY OF THE INVENTION

Disclosed is a storage device. The storage device comprises storage media. The storage media has multiple media zones with differing zone attributes of storage performance. The storage device comprises a data channel that is connectable to a host system. The data channel communicates multiple objects that each include a requested storage attribute.

The storage device comprises an object-based storage interface. The object-based storage interface couples between the data channel and the storage media. The object-based storage interface schedules storage of the multiple objects. Each of the objects is scheduled for storage in a zone that has a zone attributes that meets the requested storage attribute.

In a first preferred embodiment, the selected zone has zone attributes that exceed the requested storage attributes.

In a second preferred embodiment, the object-based storage interface has a capability to schedule a less frequently accessed portion of an I-node for storage in a first selected zone, and a capability to schedule a more frequently accessed portion of the I-node for storage in a second selected zone that is physically separated from the first selected zone.

In a third preferred embodiment, the object-base storage interface includes a B-tree directory of multiple objects and the B-tree directory has a sort key that includes a partition identifier and an object identifier.

In a fourth preferred embodiment, the object-based storage interface schedules each object which can be fit in a single available allocation group for storage in such single allocation group.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
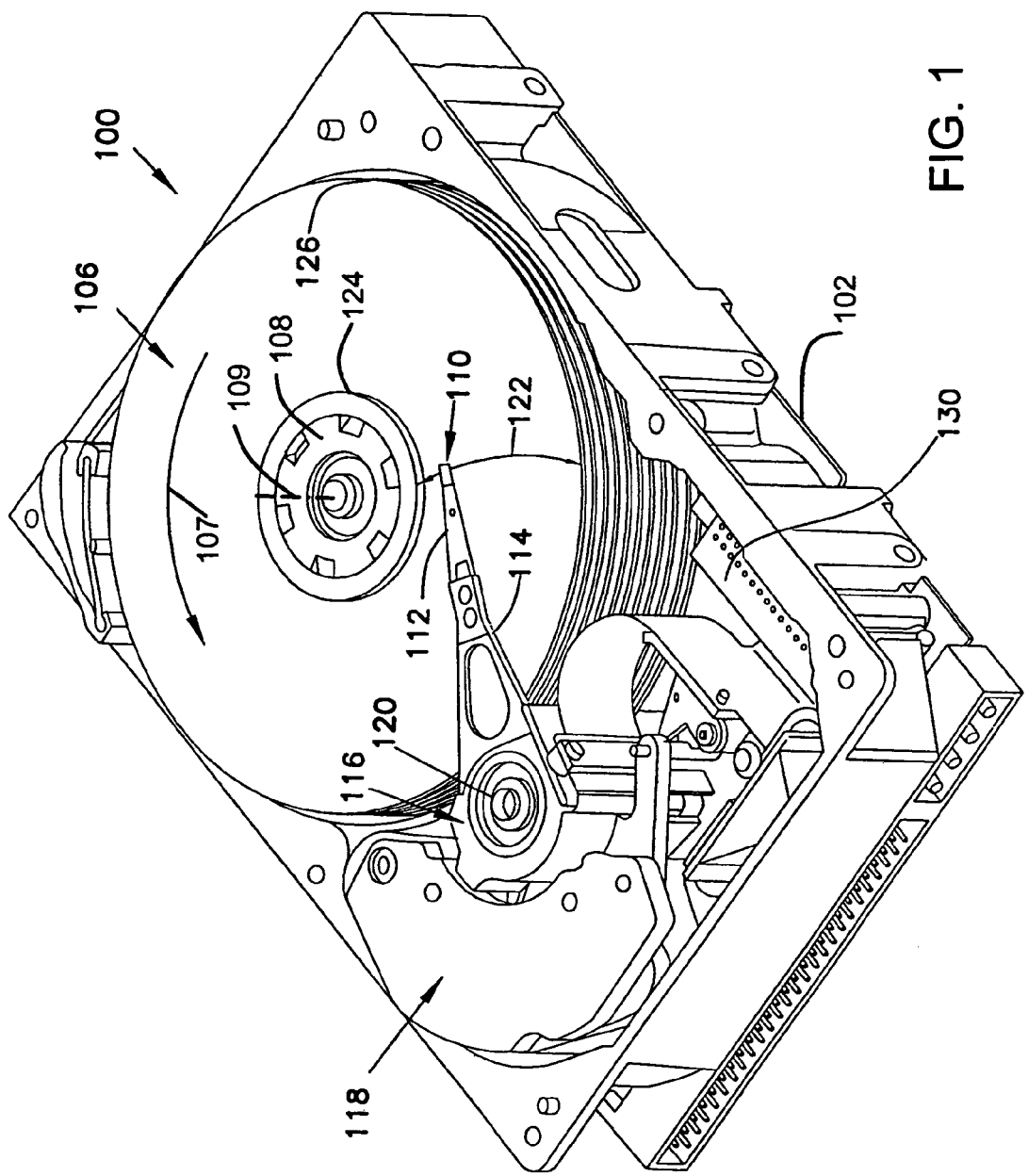
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
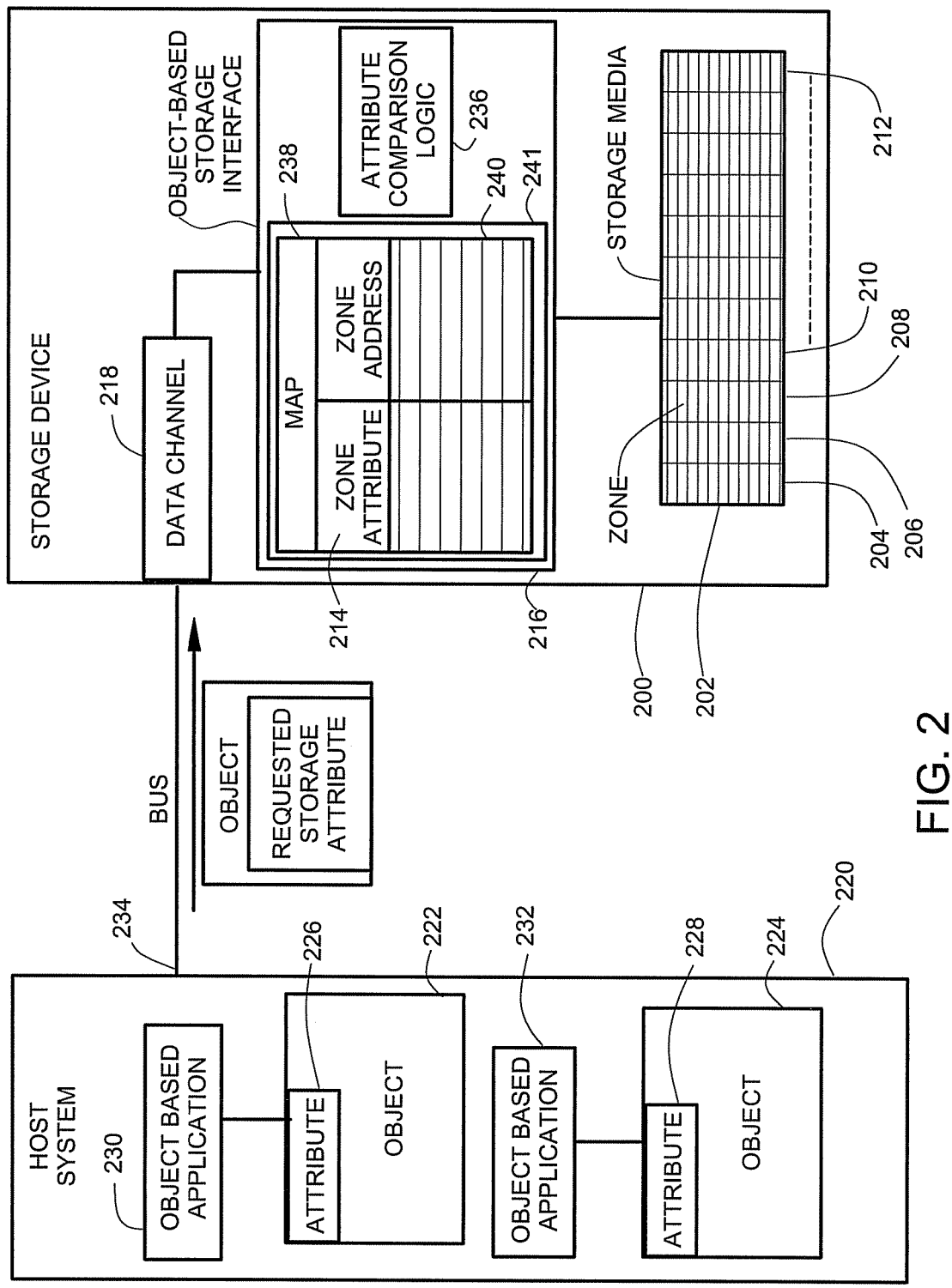
FIG. 2 illustrates a first embodiment of an object-based storage device.

FIG. 2 illustrates object-based smart allocation and servicing processes for object-based data storage. The processes provide for improved performance, such as quality of service (QoS), data transfer rate, low jitter or reliability, on a storage device 200, such as a disc drive. The object-based disc allocation processes utilize an object-based storage interface 216 to acquire hints such as requested storage attributes 226, 228 generated by object-based applications 230, 232, or generated by users. The requested storage attributes 226, 228 can include Quality of Service (QoS), reliability, data transfer rate, low jitter or other data storage or retrieval needs for an object (such as objects 222, 224) or for a file. The object-based storage allocation processes uses these hints to optimize disc performance and deliver requested QoS, reliability, speed or multiple requested attributes for the object or file. This is accomplished by making smart decisions when allocating storage space in storage media 202 for the object and while servicing the object. Different portions of the storage media 202 have different performance characteristics, and the smart decisions allocate storage of objects according to the storage or retrieval needs of the object.

In FIG. 2, the storage device 200 comprises the storage media 202. The storage media 202 has multiple media zones 204, 206, 208, 210, 212 with differing sensed zone attributes 214 of storage performance. The storage device 200 is preferably a disc drive. The storage media 202 is preferably a magnetic storage disc divided into zones. Values of the sensed zone attributes 214 are preferably stored in alterable non-volatile memory 241 that is part of the object-based storage interface 216 within the storage device 200. Sensed zone attributes 214 can be sensed by testing a particular storage device 200 or by testing a representative sample of a group of storage devices 200, or both.

The storage device 200 comprises a data channel 218 that is connectable to a host system 220 via a host system bus 234. The data channel 218 communicates between the host system bus 234 and the object-based storage interface 218 and provides data format conversion. The data channel 218 receives object 222, 224 from the bus 234. Objects 222, 224 each have a requested attribute 226, 228 that is associated with the object 222 or 224. The requested attributes 226, 228 can comprise quality of service (QoS) attributes, reliability attributes or other requested performance attributes of an associated object. The object-based storage interface 216 couples between the data channel 218 and the storage media 202. The object-based storage interface 216 controls storing each object in selected media zone 204, 206, 208, 210, 212 where the sensed zone attributes 214 exceed the requested storage attributes 226, 228. The object-based storage interface 216 comprises attribute comparison logic 236 that compares a requested storage attribute of an object to the sensed storage attribute of available zones and allocates space in zone where the sensed storage attribute meets or exceeds the requested storage attribute. The object is then stored in the selected zone.

The zone attributes 214 are preferably stored in a map 238 that maps sensed zone storage attributes 214 as a function of zone physical addresses 240. The storage interface 216 preferably schedules an object for storage in a zone which minimally meets the requested storage attribute or that optimally exceeds the requested storage attribute. The attribute comparison logic 236 can comprise a scheduling algorithm to optimally store multiple objects in the zones. The algorithm can include fuzzy logic to perform reallocations to optimize use of available storage space under changeable conditions of usage or changeable conditions of sensed storage attributes. Such reallocations can be performed in background processing, or alternatively in foreground processing of storage allocation.

An object is a logical unit (i.e., collection of bytes) of storage with well-known, file-like access methods (e.g., read, write) and attributes describing the characteristics of the object. A device that stores objects is called an object-based storage device (OSD). For OSD drives (i.e., disc drives that store objects), new attributes are defined by a user or application program and are associated with objects to facilitate better communication between users and storage devices (disc drives). By using these attributes, users (or application programs) indicate what they require from the storage device for a particular object and can provide useful hints about the object (e.g., how the object is going to be used, whether it is a fixed size object or not, etc.) to the storage device. Then, device uses this information when making decisions on where or how to store the object and how to service it when the object is requested.

Current block-based storage devices, namely disc drives, are relatively unadaptable in terms of storage strategy. Block-based storage devices simply store blocks of data and service them to users when needed. Although they perform some basic allocation functions (e.g., re-mapping bad sectors), they are unresponsive to the content of the data they are storing and what the user requirements for the data are. Therefore, they cannot effectively deliver special QoS or reliability for specific sets of data. Neither can they do performance optimizations of storage locations based on how the data is used. Some of these functionalities can be implemented at the host system 220 level (i.e., file system), but the host doesn't have access to as much information about the physical characteristics of the disc and its components (e.g., media, possible defects, etc.) as can be accomplished with attribute comparison logic 236 in the storage device 200 itself.

As illustrated in FIG. 2, the object-based storage device (OSD) 200 moves the low-level storage functions from the host system 220 level (i.e., file system) into the storage device 200 itself. An OSD disc drive performs all the space management functions at the drive level. Therefore, the drive knows what objects (files) are stored on the drive and exactly where the pieces of the objects (files) are located on the drive. Furthermore, the disc drive has all the sensed information about the physical components (e.g., media, r\w head, etc.), their capabilities (throughput per zone), and current status (e.g., bad/re-mapped sectors).

Not all user data is the same and not all user data requires the same level of performance or reliability. For some (e.g., Excel spreadsheet), reliability is more important than performance, while some others (e.g., video streams) performance is top priority. Every application has some unique characteristic that would help in optimizing the disc performance for its data only when they were known at the disc level as illustrated in FIG. 2.

A user or a software application defines attributes and associates the attributes with objects to facilitate better communication between users (or applications) and disc drives on what the user requirements are and how users can pass some useful information down to disc drives for optimum performance. These attributes can include quality of service (QoS). QoS attributes can include requested QoS which is a user or application requirement for the drive. QoS attributes can include minimum QoS: This is the minimum level the user or application can accept. The drive will try to deliver requested QoS as much as possible. If the drive cannot deliver minimum QoS or better, it can deny the request. Users or applications can issue another request with a smaller minimum QoS if desired. QoS can be represented with a relative scale of numbers (e.g., a scale of 1 to 10) or with absolute performance numbers (i.e., transfer rate at Megabytes per second and jitter).

Given these QoS parameters (attributes), a disc drive can do a number of things to satisfy the user requirement by using disc level knowledge. For example, the disc drive can use zoning information in which different portions of the drive can be used to store the data based on requested/minimum QoS. The outer tracks on a disc give considerably better performance (throughput) than inner tracks. For high QoS levels, these outer tracks can be used.

The disc drive can use a priority-based disc scheduling algorithm to differentiate between objects of different QoS levels. The portion of disc with bad/re-mapped sectors can be avoided for high QoS objects. Multiple copies of the same object can be stored on different parts of the disc and, when the object is requested, the nearest object can be read to minimize access time.

Two types of Reliability are relevant. Requested reliability is what the user expects from the drive. The drive will try to deliver requested reliability as much as possible. Minimum reliability is the minimum level user is willing to accept. If the drive cannot deliver minimum reliability or better, the drive will deny the request. Users can issue another request with a smaller minimum reliability if they want to. Reliability can be represented with a relative scale of numbers (e.g., 1 to 10) or with absolute definitions such as "store two copies of this object". Given these reliability attributes, a disc drive can do a number of things to satisfy the user requirement by using disc level knowledge. Some of them are listed below:

1. Avoiding "hot" regions of the disc for high reliability objects. Hot regions are those parts of the disc that are frequently written. The drive controls the layout of the disc and knows what parts of the disc are frequently written. Frequently written areas are more susceptible to errors. The drive improves reliability of an object by storing it away from those objects that are updated/written frequently.

2. Keeping multiple copies of the object on different surfaces/platters improves the reliability of the object. If one surface is damaged or one head is crashed, other copies are available to recover the object. Objects requiring high reliability can be stored in this fashion.

3. Background scanning on reliable objects to assure their reliability.

4. Background scanning on unused portions of reliable regions on the disc, so that when objects are stored on those regions, their reliability is assured. Loose particles on the surface sometimes damage some sectors and the damage is only recognized after a read operation. So, a write operation to one of these sectors will succeed and the drive/application will not know that the data is actually not recoverable. This is especially bad for objects (files) that require high reliability. Doing background scans on these high reliability regions will detect and mask out these bad sectors ahead of time hence preventing loss data.

5. Improved error correction codes (ECC) can be used for high reliability objects to assure proper recovery in the case of a media failure.

6. Lower density (TPI) areas of the disc can be used high reliability objects. For example, outer tracks on a disc are more reliable due to lower density (TPI) than inner tracks. These tracks can be used for storing high reliability objects.

7. Another alternative is using every other track to store data, hence reducing the affect of neighboring tracks and improving reliability.

8. Using techniques that are available at the disc level such as write-verify will also improve the reliability of an object.

A "usage hints" attribute enables the applications to pass some information to the drive about how the object is going to be used so that the drive can take advantage of this knowledge when making decisions on how/where the object is stored and how it is serviced. Some possible values for this attribute are defined below:

1. Stream object: tells drive that this is a stream object and will be accessed in big read chunks. The drive stores this object on consecutive sectors (by avoiding fragmentation) possibly on the outer tracks to improve the performance.

2. Transactional object: tells drive that this is an object that will be accessed in smaller chunks and in a random manner. Since sequential read performance is not important for this type of an object, the drive can use this information to store the object in smaller fragmented portions of the drive and hence improving disc utilization.

3. Read-only object: tells drive that this object is not going to be written and it is fixed size. The drive uses this information to store the object next to other objects without leaving any room for growth and hence optimizing disc usage.

4. Requested object size: tells drive that the object has a requested object size. The object is then stored on the media where the requested amount of consecutive space is available. The drive then uses this information to reserve enough consecutive sectors for this object for future use, hence eliminating unnecessary future fragmentation and performance problems. The object can, however, grow later beyond it requested size, in which case the object can become fragmented.

5. Expected object growth size: tells drive that the object is to grow in these increments. The drive optimizes its space allocation algorithm based on this information to reduce fragmentation of objects.

Figure 3:
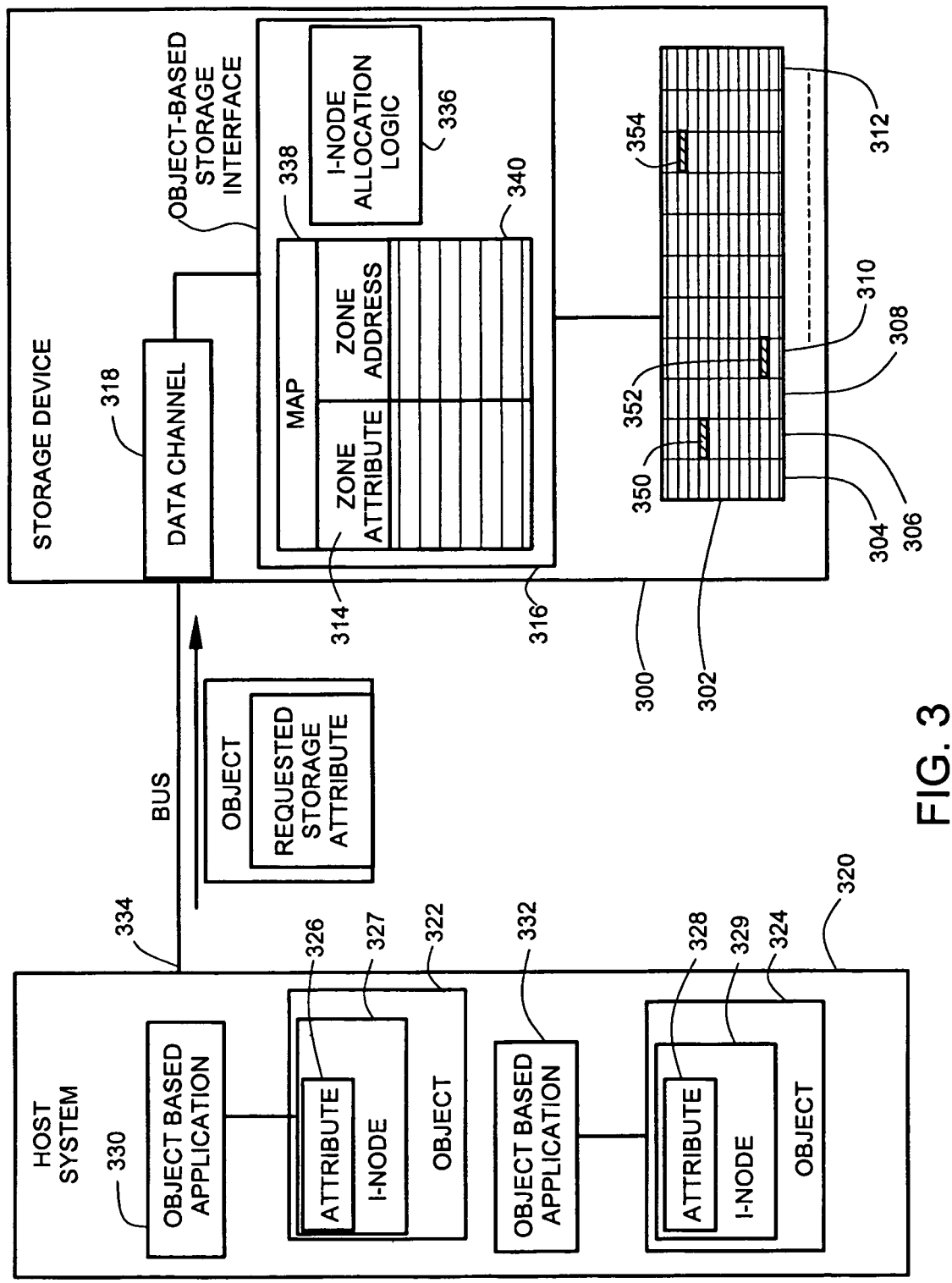
FIG. 3 illustrates a second embodiment of an object-based storage device.

FIG. 3 illustrates a storage device 300. The storage device 300 comprises storage media 302 having multiple media zones 304, 306, 308, 310, 312 with differing zone attributes 314 of storage performance.

The storage device 300 comprises a data channel 318 that is connectable to a host system 320 via bus 334. The host system 320 is comparable to the host system 220 in FIG. 2. Object based applications 330, 332 or a user generate objects 322, 324. The data channel 318 receives an object such as object 322, 324 that has storage attributes 326, 328 attached to the object in a portion of I-nodes 327, 329 which are part of the data structures of the objects 322, 324.

The storage device 300 comprises an object-based storage interface 316. The object-based storage interface 316 couples between the data channel 318 and the storage media 302. The object-based storage interface 316 comprises I-node allocation logic 336. The I-node allocation logic 336 has a capability to schedule less frequently accessed portions of the I-nodes 327, 329 for storage in a first portion of one of the multiple media zones 304, 306, 308, 310, 312. The I-node allocation logic 336 has a capability to schedule a more frequently accessed portion of the I-node for storage in a second portion of the same one of the multiple media zones 304, 306, 308, 310, 312.

The first and second zones are physically separated from one another and have different sensed attributes. The more frequently accessed portion of the I-node is preferably stored in a zone with higher speed sensed attributes, and the less frequently accessed portion of the I-node is preferably stored in a zone with lower speed sensed attributes. The zone attributes 314 are arranged in a map 338 with physical zone addresses 340. An individual I-node such as I-node 327 is stored at physically separated locations 350, 352, 354 that are at zone addresses with different zone attributes.

The I-node allocation logic 336 can comprise a separation algorithm to optimally store multiple parts or segments of the I-node in the physically separated zones. The separation algorithm can include deterministic or fuzzy logic or both to perform reallocations to optimize use of available storage space under changeable conditions of usage or changeable conditions of sensed storage attributes. Such reallocations can be performed in background processing, or alternatively in foreground processing of I-node allocation.

The files on a traditional file systems comprise user data as well as metadata. The metadata portion of a file comprises information such as time-stamps and the location of the user data blocks. The metadata is kept in a structure referred to as an I-node. This structure contains extensive information about the file other than the user's data. Some information in the I-node structure is frequently updated to reflect the constantly changing state of the file, and therefore requires that it be written to the storage device repeatedly (e.g., the access time). Other information in the I-node seldom or never changes after the file is created (e.g., the creation time and owner). Some fields in the I-node are critical to the file's integrity (location of data blocks), while some fields have no direct effect on the file's integrity (time stamps).

By separating the attributes of the metadata in the I-node into two sections, the total amount of file information that needs to be updated on the storage device can be reduced. At the same time, the most critical information about the file is re-written less often and is therefore less likely to become damaged. Thus both performance and integrity are improved.

The file information structure (I-node) contains information about the location of file data on the storage device, time stamps, and various other attributes. File information can be classified as attributes that are updated during read operations, write operations, or not updated.

File read operations are typically more prevalent than write operations. Therefore attributes that are updated when a read occurs are changing more often than those that change during a write operation. In addition, the attributes that are updated during a read operation are not critical to the file's integrity.

By separating the attributes that are updated during read operations into a physically separated structure in the storage media, the following advantages can be are achieved:

1. Because the attributes associated with read operations are a small fraction of the total file attributes (e.g., file access timestamp), the structures that are changing due to read operations are much smaller than the I-node, and therefore more read attribute structures can be packed into a single disc block. This increased density results in a higher cache hit rate, and a reduced total volume of data that needs to be written back to the storage device.

2. The attributes that are updated during a read operation are generally not critical to the integrity of the file (e.g., access timestamps), whereas the attributes modified during a write operation are very critical (e.g., data block locations). Every write operation to a disc drive has a risk of failing and leaving the data block corrupted. When stored together, critical information is put at risk to update non-critical information. Placing the attributes updated during read operations into a different structure in a different block of the storage device removes the potential risk of damaging file critical information during a read operation.

3. Reducing the information stored in the I-node will either allow room for additional file information or allow the size of the I-node structure to be reduced, either of which will increase the usable data density in a disc block resulting in a higher cache hit rate.

4. The time required to read the attribute structure should it not be a cache hit is overlapped with the file operation by scheduling the read at the beginning of the operation but not waiting for the read to complete until the very end of the operation.

5. Since only one of the two structures described above is modified during any one operation, there is no performance penalty to update the attributes as the result of the separation.

Traditionally, file systems use an I-node to contain all file attributes as well as information that defines which blocks of disc contain the file's data. If a file grows to the point where there is not enough space to contain references to all the data blocks, additional "I-nodes" are allocated and linked to the first I-node. Note however that these additional I-nodes do not have the same structure as this would needlessly duplicate some information. They are I-nodes only in the sense that the space comes from the same pool. These type of I-nodes are referred to here as "I-node extensions".

The need to re-write an object's I-node every time the object is accessed for the sole purpose of updating the access time is problematic. It is thought that repeatedly re-writing the I-node reduces the reliability of OSD by increasing the chance of accidental damage to the I-node. Losing the I-node results in losing the object data. Therefore, there is the desire to move frequently modified object attributes to a location outside the object's I-node. These frequently modified object attributes are referred to here as "attribute nodes". An important feature is division of attributes between the main I-node and the attribute node.

One concern with using attribute nodes is that it requires multiple block reads to access all of an object's attributes, thus reducing system performance. This impact on performance can be greatly reduced if all attributes required to process the user request are kept in the I-node. An exemplary sequence of events is:

1. Schedule read of I-node
2. Schedule read of attribute node
3. Wait for I-node to be available
4. Use attributes in I-node to translate OSD request to LBA request and initiate data transfer
5. Wait for attribute node
6. Update attributes in attribute node and mark as dirty.

Some aspects of this separation can include:

1. attributes that are required to process an Object request and translate it into an LBA request are in the I-node so they are available as fast as possible; and
2. attributes that are updated at high frequency are placed in the attribute node to reduce potential damage to the I-node. Attributes required to process a request are: Creation time, Logical Length, Used Capacity, and Capacity Quota (the last two are only needed for write operations). Attributes that are modified on a read operation (defined to be the predominant operation performed and therefore the highest modification rate) are the attribute access time and data access time.

There are other attributes that don't fall into either category. First, there are the attributes that are modified on a write operation: data modified time, attribute modified time. There are also attributes that are changed very rarely or never: Username. Because of the variable sized nature of this username attribute, this username attribute can be located in a third area that is not in either the I-node or the attribute node.

Attributes that are updated on a write operation are stored in the I-node. On a write operation, the I-node will nearly always need to be update due to additional blocks being added. The attributes in question are closely related to allocated blocks. They all change at the same time. Keeping them together in the I-node results in only one structure being modified and needed to be flushed to disc. The attribute node would not be modified on a write operation. If these attributes were in the attribute node, both the I-node and the attribute node would be modified on write operations.

Total space used by the attributes is not significantly affected by attribute location. It only effects the proportion of I-node to attribute node space used. I.e., information for n objects will require x I-node blocks and y attribute node blocks. Moving attributes between I-node and attribute node will, the size of the I-node will be smaller. This does not increase the amount of metadata that can be stored in cache. So in terms of disc or cache utilization, there are no gains from adjusting the location of attributes in either direction.

Placing these attributes in the I-node keeps the I-nodes smaller, however it does not increase the number of I-nodes that can be stored in cache. N objects will need x+y blocks of metadata no matter how the attributes are divided. So the total number of objects represented for a given amount of cache is the same no matter how the attributes are divided. There is a difference in the granularity (how many I-nodes are in a single block). But by reading multiple blocks of I-node or attribute nodes at a time, identical results can be achieved with any division of the attributes. The biggest gains are achieved by reducing the amount of metadata that will need to be flushed back to disc.

For write operations, by keeping all attributes related to writing an object in the I-node, only the I-node will need to be flushed to disc instead of both the I-node and the attribute node. While some methods can be used to optimize writing two related blocks, it will always take longer to write two blocks than one.

For read operations, which are more frequent than write operations, only the attribute node will need to be flushed to disc. By keeping the attribute node size low, more attribute nodes will be in a single block. For just the attributes defined above as high frequency, at least 256 attribute nodes can be placed in one block. Using the tightest packing possible, up to 341 attribute nodes could be packed in a block, but this will create data alignment problems that will impact software performance. In comparison with other methods of attribute separation, the present method of separation provides more attribute nodes in a single block.

Separation provides the best performance for both write operations-write operations have only one dirty metablock instead of two, and read operations will have a greater chance of sharing the block that holds the attributes that the operation will modify.

Figure 4:
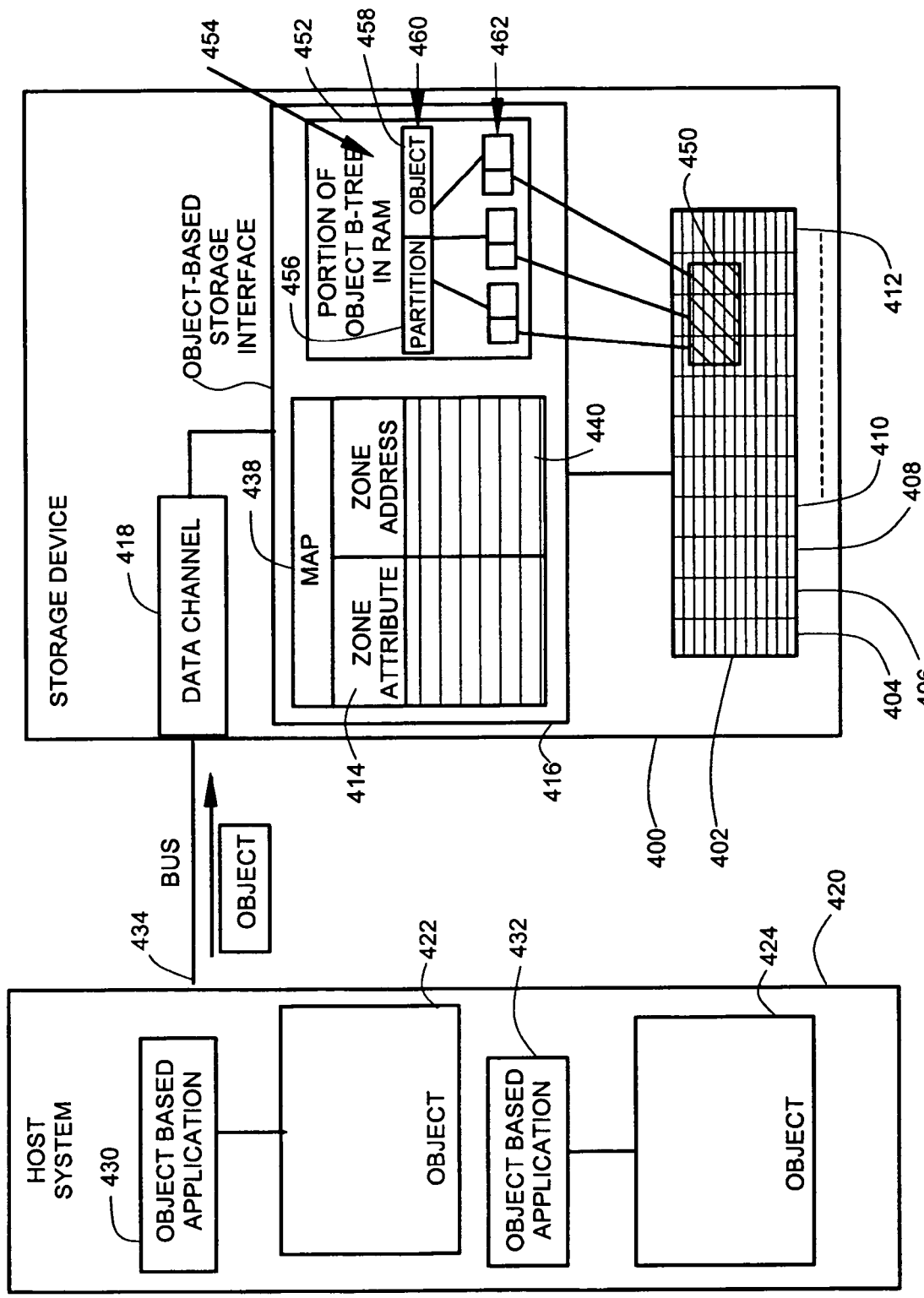
FIG. 4 illustrates a third embodiment of an object-based storage device.

FIG. 4 illustrates storage in an object-oriented storage device (OSD) 400. An object directory in the storage device 400 includes a central B-tree, or tree-like directory structure. The B-tree comprises a first B-tree portion 450 that is stored in storage media 402. The B-tree comprises a second B-tree portion 452 that is stored in random access memory (RAM) in an object-oriented storage interface 416.

The storage device 400 comprises the storage media 402. The storage media 402 comprises physical media zones 404, 406, 408, 410, 412. The storage device 400 comprises a data channel 418 that is connectable via a bus 434 to a host system 420. The data channel 418 communicates multiple objects 422, 424 between the host system 420 and the object-based storage interface 416 in the storage device 400. The objects 422, 424 can be generated by object based applications 430, 432 or by a user.

The object-based storage interface 416 couples between the data channel 418 and the storage media 402 to store multiple objects such as the multiple objects 422, 424 in the physical media zones 404, 406, 408, 410, 412 according to object partitions. The object-based storage interface 416 includes a B-tree directory portion 452 of the multiple objects. The B-tree directory includes a sort key 454 that comprises a combination of a partition identifier 456 and an object identifier 458. The B-tree portion 452 comprises a root node 460 and at least first tier 462 of child nodes that are in RAM.

A hierarchical file system is organized into files (objects) that contain user data and directories into which files are placed. Files are placed into directories as a means of organizing and locating the files. Directories can be nested (with additional tiers) to further divide and organize files. The function of a file system directory is to map a file identifier (e.g., a file or subdirectory name or OSD object ID) into the location of information about that file or subdirectory (commonly referred to as an "I-node"). As a result, finding a particular file may require multiple disc accesses as each nested directory is opened and searched for the necessary information.

The OSD storage device, however, does not have a hierarchical file system. Objects are stored in a "flat" namespace within each partition. An OSD partition is a soft (non-physical) definition of space, unlike a traditional disc partition where each partition is a fixed section of the disc's space. While the purpose of an OSD partition is comparable to the purpose of a hierarchical disc partition, the management of an OSD partition is similar to managing a directory. In order to locate an object in a partition, the file system a) locates the soft partition; b) reads the partition's object list to locate the object; and c) read the object information.

By maintaining a single object directory for all objects in an OSD, object search time is deterministic and significantly reduced, as well as improving the reliability of the file system.

A single B-tree structure contains all object ID's regardless of what partition the object is in. This allows a single tree search to locate the I-node of any object on the device.

The sort keys in the B-tree consist of a combination of the partition identifier and the object identifier. This ensures that each object has a unique key. It also organizes the entries in the B-tree such that the entry for a partition is followed by the entries for all the objects in that partition. The operation of listing all objects in a partition can be achieved by searching for the partition, followed by stepping sequentially through the entries in the directory leaves until the next partition is found.

By organizing the B-tree such that all but the leaf nodes are always in RAM, the process of locating an object's "I-node" on the device will require at most a single disc access. Thus the directory search is deterministic.

A modified algorithm for splitting nodes is employed that improves space usage for sequential ID insertion from 50% best case to potentially more than 99%. This is achieved by performing the node split at partition boundaries where the growth is occurring. In one example, a 33% increase in space utilization as well as an 8% decrease is execution time is achieved in comparison with a standard B-tree algorithm.

The above structure allows for flexible scaling of the directory capacity by a combination of allowing RAM resident directory nodes to be set to any size (i.e., they can contain any number of entries—these nodes are not tied to the size of a disc block) and by adjusting the maximum height of the tree.

Benefits include a deterministic search time. At most, one disc access is needed, and the access is to a known location. Directory space utilization is also improved by using the B-tree algorithm designed for OSD object ID's. Integrity and reliability can also be improved by placing the object directory in a reserved/protected area of the storage device instead of in files/objects that would be in random locations on the device. Special provisions can be made to insure the integrity and reliability of this critical information. Partition directory "list" operations can be executed without the need to find the partition itself, improving performance.

Figure 5:
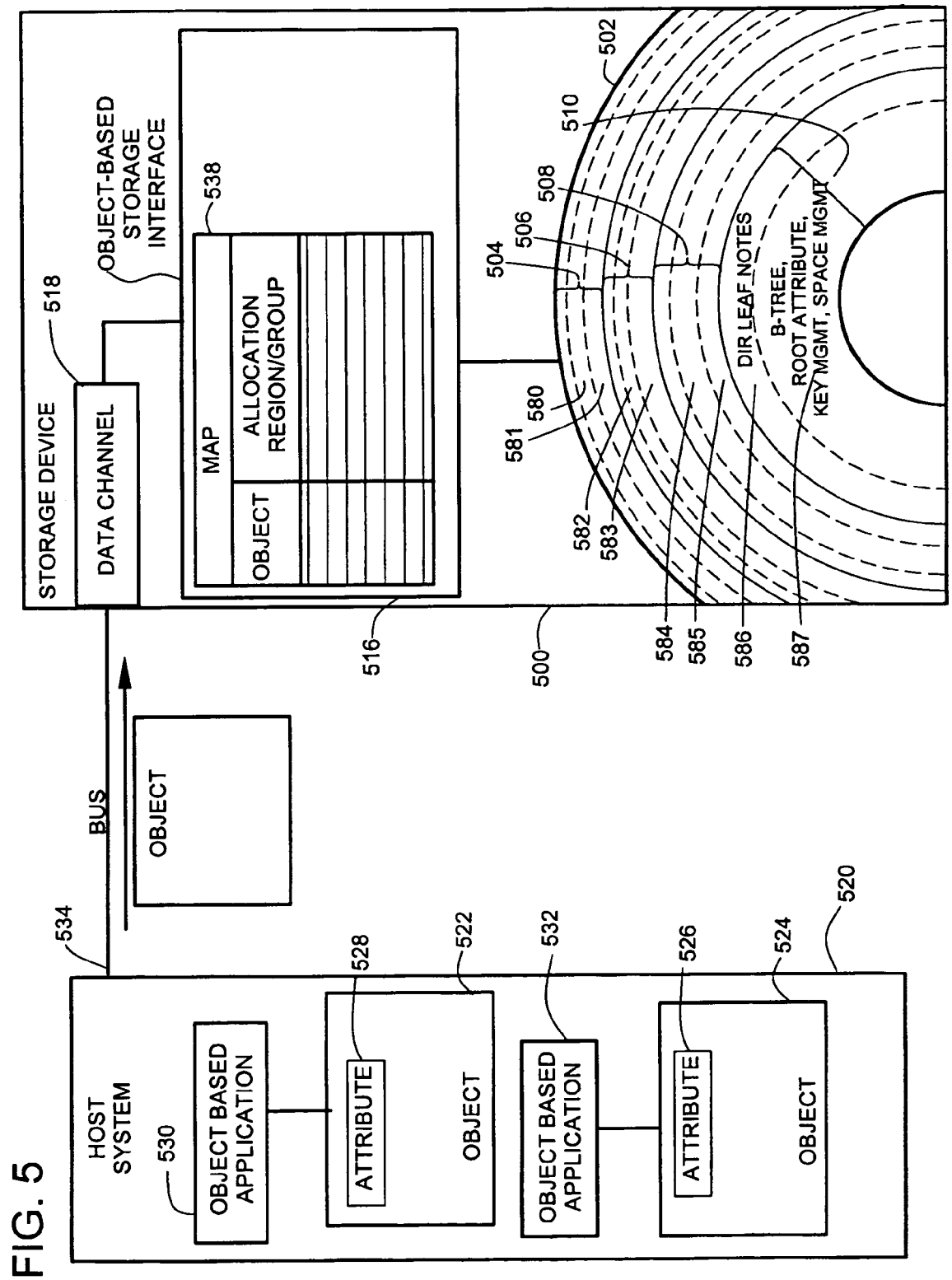
FIG. 5 illustrates a fourth embodiment of an object-based storage device.

FIG. 5 illustrates data allocation and layout on an OSD data storage device 500. The storage device 500 comprises storage media 502 in the form of a disc having multiple media regions 504, 506, 508, 510 with differing attributes of storage performance. The media regions 504, 506, 508, 510 are organized into physically proximate allocation groups that are addressable at a byte level of addressing. Media region 504 comprises allocation group 580, 581. Media region 506, comprises allocation groups 582, 583. Media region 508 comprises allocation groups 584, 585. Media region 510 comprises allocation groups 586, 587.

The storage device 500 comprises a data channel 518 that is connectable via a bus 534 to a host system 520. The data channel 518 communicates multiple objects 522, 524. The multiple objects 522, 524 have requested storage attributes 526, 528 included in the objects.

The storage device 500 comprises an object-based storage interface 516 coupled between the data channel 518 and the storage media 502. The object-based storage interface 516 schedules each of the multiple objects 526, 528 for storage in a single allocation group when size permits storage in a single allocation group. In other words, a particular single object (such as object 526 or 528) is stored in a single allocation group that meets the requested storage attribute.

Traditional file systems are usually part of the operating system of the host system, and are separated from the disc drives they control. The concept of presenting a "logical device" (either via a volume manager or a direct block device) to the file system doesn't allow the file system to know most storage attributes of the underlying drives that the file system manages. This knowledge includes things like sector size, performance zones of the disc or high reliability areas of the drive. This separation has stopped these files systems from taking advantage of these drive features for performance and reliability. These issues are overcome with the OSD drive. With an OSD drive, a file system will not need to know sector size and has the ability to ask to place data with in certain areas of the disc to take advantage of the previously mentioned sensed performance and reliability characteristics of the drive. All this happens because the burden of data layout and allocation is no longer in the host system, but is instead in the storage device 500.

Data layout and allocation of space on storage device 500 is controlled by the storage device 500 itself. The storage device 500 takes advantage of its knowledge base of the media to best write and read user data for performance and reliability.

Data space on storage device 500 is laid out to take advantage of the performance of head seeks in a forward direction and to minimize head movement in general. Head seeks on a disc are detrimental to good performance. During a sequence of related seeks, the heads are preferably moved in a forward direction, from outer tracks to inner tracks.

Data space is preferably divided up into fixed size units. These units known as "allocation groups" have both the user data space and the information to keep track of this space. Multiple "allocation groups" are used to create regions on the disc. These regions may conform to the physical zoning of a disc drive. System information is preferably kept on the inner most tracks as illustrated.

For data access, the system metadata (I-nodes and maps) is accessed first, and then a seek operation accesses the user data. The motion in a forward direction takes advantage of disc skew for faster access time.

Because regions are a smaller subset of the total disc area, working within a region keeps the seek distance as small as possible thus seeks are faster. OSD also allows the host file system to work in the smallest unit possible, the byte of data. The drive can store the data in any size chunk (sector size) it wants and takes care of the data not falling on sector boundaries.

Since head seeks are minimized, allocation of space on the disc for creation of an object and data space for that object works on the decisions based on proximity. The closer data blocks are to the I-node, the better performance there is in reading or writing that object. Contiguous space is also preferred for an object, since the heads do not have to move to another area to read or write data.

Each OSD object has an associated I-node structure that keeps track of the object. It is part of the system metadata. Where on a disc an I-node is allocated for the creation of an object is dependant on number of criteria. Unlike traditional file systems, the OSD file system has knowledge about the space on the disc. This includes things like how reliable certain areas are or how fast certain areas are. Also, under OSD, the user can give the storage interface 516 hints as to how big an object is expected to be or what kind of performance and reliability is needed.

Based on these hints, an I-node is allocated in certain regions of the disc. An I-node is stored in an allocation group knowing that a certain data rate is available and there will be a good chance that the object can grow without fragmentation as data blocks are allocated for the object. I-nodes and data blocks are preferably kept within the same allocation group, so the seek distances are kept to a minimum between I-node access and actually reading or writing the user data. This is storage decision making based on proximity.

Because a region can have multiple allocation groups, when the multiple objects are present, round robin allocation between the allocation groups can be performed in that region to allow all the objects to have a chance to grow without fragmenting them. Once fragmented, it takes multiple disc head movements to get to the user data thus reducing performance. An object 1 can be in allocation group 0, region 0, and an object 2 can be in allocation group 1, region 0 and so on. By working within a region, we minimize head movement. An overall goal is to reduce fragmentation and thus reduce head movement.

Particular sizes of objects can be isolated to a single allocation group on the drive. It can be undesirable to have small objects intermixed with larger objects in that the small objects may cause fragmentation of the large objects. The concept to "Quality of Service" can be used to separate objects on the drive.

Unlike traditional file systems where a user (host) has no control over where on the disc his data winds up, OSD will allow a "Quality of Service" attribute (QoS) to be sent by the host. There will be a minimum and maximum QoS that will tell the OSD file system what range of quality (performance or reliability) that the host system will accept. This QoS will tell the OSD file system to allocate an I-node and data blocks within certain regions on the disc.

For example a client could put objects that need the highest performance in the regions that have the highest performance on the disc. The same client can put other objects that may not need the same kind of performance or have other criteria into other regions of the disc. This keeps the two object types from actually fragmenting each other for better performance.

Allocation of space is now moved to the drive itself and the file system has this burden removed. In a shared/clustered environment, multiple file systems are now relieved of doing this work. The drive becomes the central point of allocation thus making a shared environment that much easier. Multiple file systems themselves don't have to check with each other as to where they allocate the data. The drive does it for them.

Host file systems will not have to support doing read/modify write operations because their input-output (I/O) requests do not fit a sector. The drive handles this. All file systems work at the smallest unit, the byte. This allows the hosts to do fewer I/O requests. The drives ability to round robin requests helps keep from fragmenting the disc between multiple files and the ability to extend files (growing extents) will help from fragmenting individual files.

Because the drive knows its own reliability and performance characteristics, file system I/O can ask to be placed on a area of the disc that meets certain performance and/or reliability needs which is something no traditional file system can do now. The concept of "soft partitioning" allows certain applications to custom fit their data on the drive. This is something an application cannot do in a traditional file system.

In preferred embodiments, read ahead (also called "prefetch") of objects is used to enhance performance in the object based storage device. Read ahead is particularly effective in object based storage devices because all of the blocks in which objects are stored are known. This contrasts with block devices in which a track is read, and the track may include data from a file other than the file being accessed. With object oriented storage, read ahead reads only blocks associated with the object being accessed.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the storage system while maintaining substantially the same functionality without departing from the scope and spirit of the present invention. In addition, although the preferred embodiment described herein is directed to an object-based disc drive system for digital data storage, it will be appreciated by those skilled in the art that the teachings of the present invention can be applied to other data storage systems, without departing from the scope and spirit of the present invention.

What is claimed is:

1. A method for allocating data attributes from an i-node to storage media, the method comprising:
    sending, by a host system, a data object containing i-node attributes to a storage device, wherein the storage device comprises:
        a data channel;
        an object-based storage interface, coupled to the data channel, wherein the interface is operable to allocate data to particular media zones for storage based on access frequency; and
        storage media, coupled to the object-based storage interface, with multiple media zones having differing zone attributes of storage performance, and wherein the zones are physically separate;
    receiving the data object through the data channel;
    providing the data object to the object-based storage interface;
    receiving the data object at the object-based storage interface;
    analyzing the data object i-node attributes to determine one or more i-node attribute access frequencies;
    allocating to the storage media, by the object-based storage interface, the i-node attributes, based on the one or more i-node attribute access frequencies;
        wherein the less frequently accessed portion of the storage media comprises i-node write attributes;
        wherein the more frequently accessed portion of the storage media comprises i-node read attributes;
    storing the i-node attributes in the allocated zones of the storage media.

2. The method of claim 1 wherein the more frequently accessed portion is stored in an I-node extension.

3. The method of claim 1 wherein the zone attributes are stored in a map that maps the zone attributes as a function of zone physical addresses.

4. The method of claim 1 wherein the zone attributes comprise zone attributes determined from a test of the storage device.

5. The method of claim 1 wherein the zone attributes comprise zone attributes determined from both a test of the storage device and tests of a representative sample of a group of storage devices.

6. The method of claim 1 wherein the object-based storage interface provides data format conversion.

7. The method of claim 1 wherein the storage device comprises stored information on the storage media including throughput per zone and remapped sectors.

8. The method of claim 1 wherein the storage device stores multiple copies of the same object on different parts of the storage media.

* * * * *